INVENTOR:
Alexander H. Galaniuk
BY
ATTORNEYS.

INVENTOR:
Alexander H. Galaniuk
BY
ATTORNEYS.

United States Patent Office 3,425,295
Patented Feb. 4, 1969

---

3,425,295
HYDROMECHANICAL INFINITELY VARIABLE POWER TRANSMISSION MECHANISM
Alexander H. Galaniuk, Southfield, Mich., assignor to Ford Motor Company, Dearborn, Mich., a corporation of Delaware
Filed Oct. 12, 1967, Ser. No. 674,911
U.S. Cl. 74—677                                    8 Claims
Int. Cl. F16h 47/04, 47/08

ABSTRACT OF THE DISCLOSURE

This specification discloses a hydromechanical power transmission mechanism for an automotive vehicle driveline having infinitely variable torque ratio characteristics. The torque ratio variation is accomplished without the use of friction clutches or brakes. A split torque delivery path is established between the vehicle engine crankshaft and the driveshaft during acceleration from a standing start, one portion being hydrokinetic and the other portion being mechanical. The torque of the hydrokinetic portion fades away as acceleration continues. During operation of the vehicle under steady-state cruising conditions, the torque delivery path is substantially mechanical.

---

Brief description of the invention

My invention is adapted especially to be used in drivelines for both front wheel drive vehicles and rear wheel drive vehicles in which the engine crankshaft is situated transversely with respect to the longitudinal axis of the vehicle. It can be used as well, however, in drivelines in which the engine crankshaft and the transmission torque delivery shafts are situated on axes that are parallel to the longitudinal vehicle axis.

A principal feature of my invention resides in the disposition of a hydrokinetic torque converter with multiple, bladed elements arranged in radial disposition and around a compound planetary gear system. The power output element of the gear system is connected drivably to the engine crankshaft through the gearing. A bypass torque delivery path complements the mechanical torque delivery path of the gearing.

The torque multiplication that is achieved hydrokinetically depends upon the speed ratio of the converter, which in turn is determined by the ratio of the absolute speed of the turbine to the absolute speed of the impellers. The impellers are connected through overrunning couplings to one element of the gearing, which is driven also by the crankshaft through the mechanical portion of the torque delivery path. As the torque contribution of the converter is reduced upon an increase in the speed ratio, the toroidal fluid circulation in the torus circuit is reduced accordingly because of the reduction in the absolute speed of the impeller that results.

As the speed of the impeller is reduced, the percentage of the torque distributed mechanically increases. Provision may be made for anchoring the impeller after the torque contribution of the hydrokinetic torque converter is at a minimum. When this is done, the torque delivery path is substantially mechanical, and these are then no hydrokinetic losses to reduce operating efficiency during steady-state cruising operation.

Reverse drive is achieved by anchoring the turbine of the hydrokinetic unit and releasing the stator. The stator, which is connected to a reaction element of the compound gearing during forward drive operation, now becomes the driving member as the element that is connected directly to the turbine becomes a reaction member. The torque delivery path is wholly hydrokinetic as the gearing multiplies the effective torque applied to the so-called turbo-stator.

Particular description of the invention

Figures 1, 2:
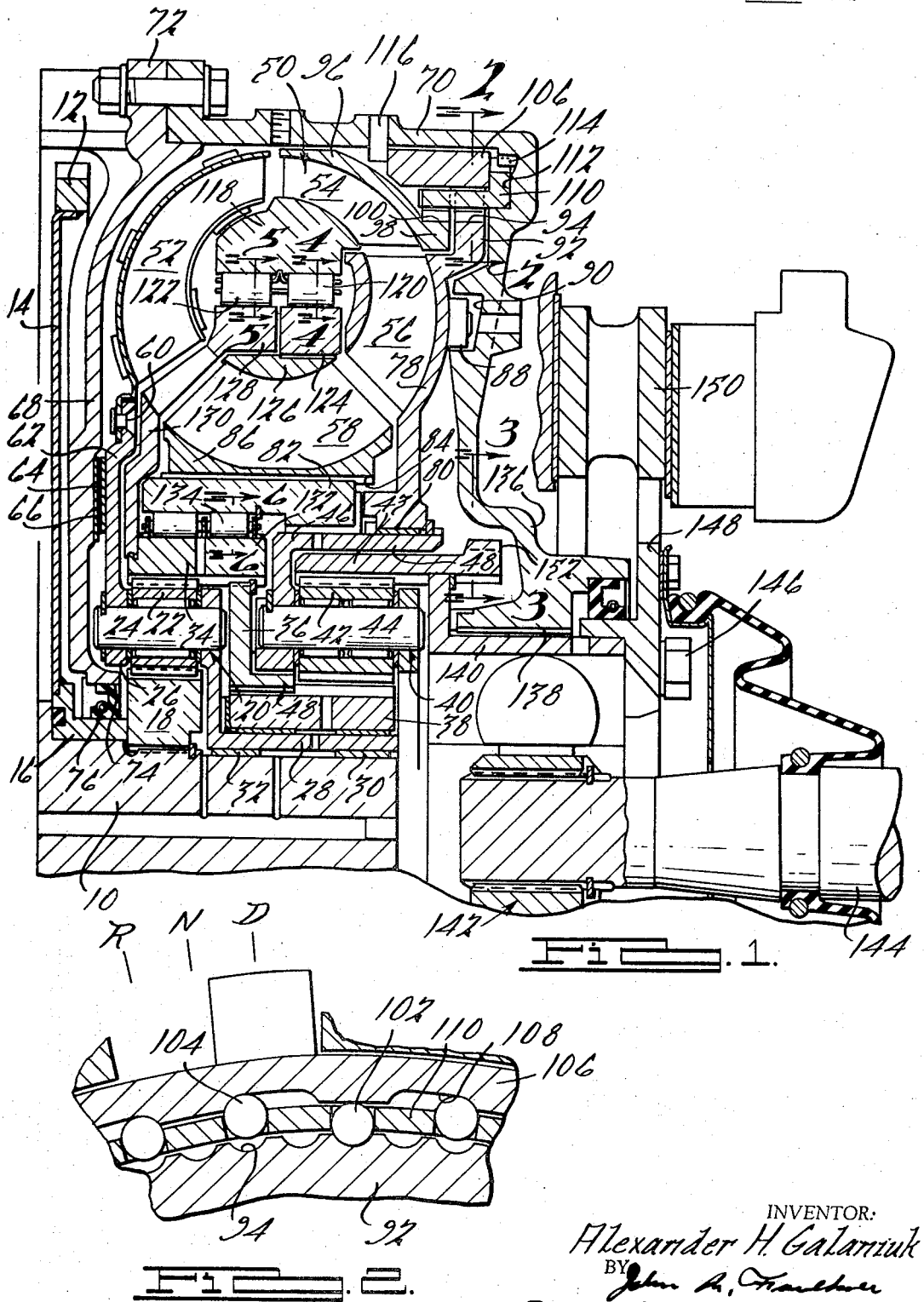
FIGURE 1 shows in longitudinal cross-sectional form a transmission mechanism embodying the improvement of my invention.
FIGURE 2 is a cross-sectional view taken along the plane of section line 2—2 of FIGURE 1. It shows the details of a brake mechanism for anchoring the stator and the turbine selectively.

Numeral 10 designates generally one end of a crankshaft of an internal combustion engine. An engine starter ring gear is shown at 12. It is carried by a drive plate 14 which in turn is secured at its hub 16 to the crankshaft 10. Splined to the crankshaft 10 is a sun gear 18 for a simple planetary gear unit 20. Gear unit 20 includes planet pinions 22 journalled rotatably on pinion shafts 24. The shafts 24 comprise in part a planetary carrier 26 which is piloted at its hub 28 on the shaft 10, suitable bearings 30 and 32 being provided for this purpose.

Pinions 22 engage drivably ring gear 34. A spacer 36, which is splined to the ring gear 34, connects the ring gear 34 with the sun gear 38 of a secondary planetary gear until 40. This gear unit comprises a ring gear 43 and a pair of planet sets, one set comprising pinions 42 which are journalled on pinion shafts 44. The shafts 44 form a part of the carrier 46.

Carrier 46 journals rotatably also a second set of planetary pinions, not shown, which engage drivably pinions 42 and sun gear 38. Pinions 42 engage drivably ring gear 43. Carrier 46 can be journalled as shown on a shoulder defined by the hub 48 of the spacer 36.

A hydrokinetic torque converter is indicated at 50. It includes an impeller 52, a first turbine 54, a stator 56 and a second turbine 58. These members are situated in toroidal fluid flow relationship in a common torus circuit. Each member has an inner shroud and an outer shroud which cooperate with flow directing blades to define flow directing passages.

The outer shroud of the impeller 52 is connected at 60 to a radially extending brake plate 62. This carries a brake disc 64 situated in juxtaposed, adjacent relationship with respect to a friction surface 66 formed on a stationary wall 68. Wall 68 forms a part of a stationary transmission housing 70. It is joined at its periphery 72 to the main portion of the housing 70 by means of bolts as indicated. The central region of the wall 68 is adapted to provide a seal opening 74, which accommodates a running shaft seal 76 surrounding the hub 16 of the drive plate 14.

The stator 56 includes an outer shroud 78 which is connected at its hub to the carrier 46 by means of a splined connection 80. The carrier 46 includes a drum-shaped extension that surrounds gear unit 40 and the splines 80 are formed on it. The drum extension of the carrier 46 provides also a bearing support for clutch hub 82 which is received within a central splined opening 84 formed in the hub 86 of the turbine 58.

The shroud 78 is formed with an annular boss 88 received in an annular bearing recess 90. A brake ring 92 formed on the shroud 78 has recesses 94 on its periphery, as indicated best in FIGURE 2.

The outer shroud 96 of the turbine 54 also is formed with a brake ring, as indicated at 98. Ring 98 also is provided with recesses 100 which correspond to the recesses 94 in the ring 92. The rollers 102 and 104 are adapted to register, respectively, with the recesses 94 and 100. The rollers 102 and 104 are actuated by a cam ring, as indicated at 106. The inner periphery of the ring 106 is formed with cammed recesses 108. The rollers 102 and 104 are held in proper spaced relationship by an adapter cage 110 that surrounds the rings 92 and 98. It is formed with openings at angularly spaced intervals and one roller is received in each opening, as indicated best in FIGURE 2.

When the cam ring 106 is shifted to the position shown in FIGURE 2, which corresponds to the forward drive position, rollers 104 move out of registry with the openings 100 and rollers 102 simultaneously register with the openings 94. The locks the stator 56 to the housing and releases the turbine 54. Movement of the cam ring 106 in the opposite direction conditions the mechanism for reverse drive operation. At that time the cam ring 108 will urge the rollers 104 into registry with the recesses 100 as the rollers 102 are moved out of engagement with respect to recesses 94. This locks the turbine 54 and frees the stator 56.

The cage 110 is received within a recess 112 and is locked at 114 to the housing 70. The cam ring 106 is held against axial displacement, as indicated in FIGURE 1, by the cam ring 110 and by one or more pins 116.

Turbine 54 includes an inner shroud 118 which forms an outer race for each of two overrunning couplings 120 and 122. These couplings may be formed with roller-type clutching elements or sprag-type clutching elements. In the former case the race 118 would be formed with cammed grooves to cooperate with the rollers. The inner race for the coupling 120 is a ring 124 which is splined to the shroud 126 for the turbine 58. The inner race for the coupling 122 is a ring 128 which is connected to a torque transfer member 130 extending through the torus circuit between the flow entrance section of the impeller 52 and the flow exit section of the turbine 58. The portion of the member 130 that passes through the torus circuit is apertured to prevent interruption in the torus flow. The inner periphery of the member 130 is keyed or splined to the ring gear 34.

Ring gear 34 defines also an inner race for an overrunning coupling 134. This comprises two sets of rollers situated between the outer periphery of the race 132 and the inner cylindrical surface of the clutch member 82 which serves as an outer race for the rollers 134.

The radially inward region of the housing wall shown at 136 is formed with a bearing opening 138 through which universal joint sleeve 140 is received. This sleeve, which is connected drivably to the ring gear 43, forms a part universal joint 142 which connects drivably the gear 43 with a driving wheel through the drive shaft 144.

The sleeve 140 is connected by means of bolts 146 to a brake disc 148. The outer periphery of the disc 148 carries a spot brake disc 150, which is used to brake the vehicle drive shaft 144.

Figure 3:
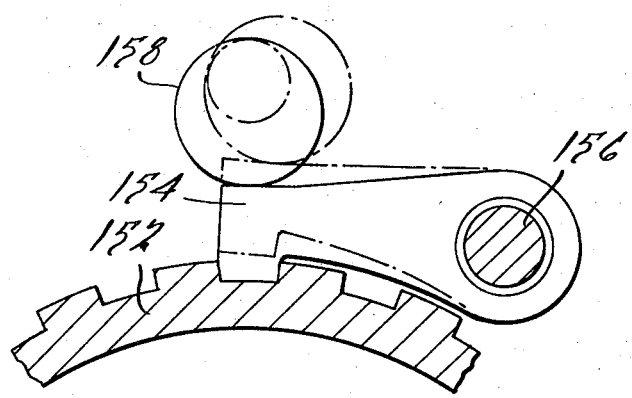
FIGURE 3 is a cross-sectional view of the parking brake as seen from the plane of section line 3—3 of FIGURE 1.
Figures 4, 5:
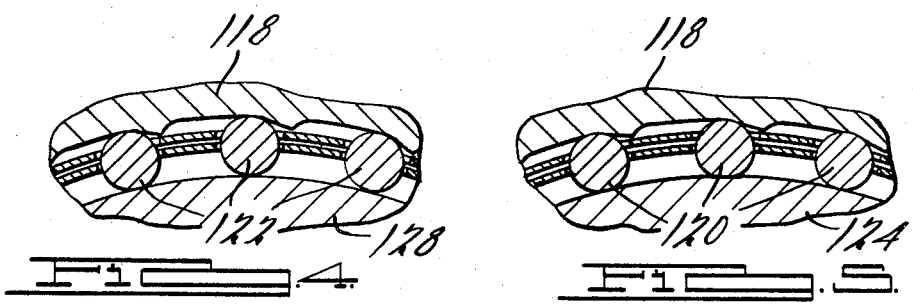
FIGURE 4 is a partial sectional view taken along the plane of section line 4—4 of FIGURE 1.
FIGURE 5 is a partial sectional view taken along the plane of section line 5—5 of FIGURE 1.
Figure 6:
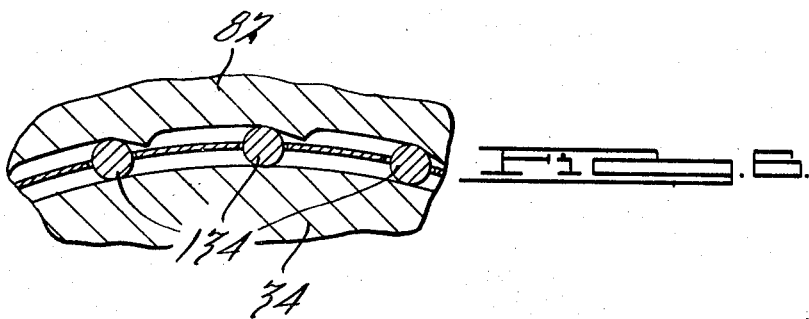
FIGURE 6 is a partial sectional view taken along the plane of section line 6—6 of FIGURE 1.

The ring gear 43 may carry also a parking brake gear 152 having teeth that engage a pawl 154. As seen in FIGURE 3, the pawl is mounted on a pivot pin 156 carried by the housing. When the pawl is oscillated in one direction by an operating cam 158, the ring gear 43 and the shaft 144 are held stationary. This condition is shown in FIGURE 3.

During acceleration from a standing start in the forward drive range the ring gear 43 is stationary since it is connected directly to the stationary shaft 144. Sun gear 38, and hence the ring gear 34, are also stationary. Sun gear 18 at this time is driven directly by the engine. If we assume that the engine is turning counterclockwise when it is viewed from a point on the axis of shaft 144, the impeller 52 will be driven at a reduced speed in the same direction. The torque developed on ring gear 34 then acts in a clockwise direction. This clockwise torque tends to drive the turbine 54 in a clockwise direction because ring gear 34 is connected directly to it through overrunning coupling 122. Since the impeller is rotating, toroidal fluid flow circulation is established. This establishes turbine torque on the turbine 54 in the usual fashion. Because of the presence of the stator 56, the torque developed on the turbine 58 also acts in a clockwise direction at this time. This torque is transferred through overrunning coupling 134 to the ring gear 34. The torque that acts on the sun gear 38 thus is the resultant of the torque delivered hydrokinetically to the ring gear 34 and the torque delivered mechanically to the ring gear 34.

The motion of the sun gear 38 is in a clockwise direction. Because of the presence of the double planetary gear elements in the gear unit 40, the ring gear 43 also will be driven in a clockwise direction. The motion imparted to the shaft 144 corresponds to a forward drive motion.

As the vehicle accelerates, the turbine 54 will be able to rotate in a clockwise direction. As the turbine speed increases, the effective turbine torque decreases. This will result in a normal tendency for the impeller to approach a zero speed.

Because of the presence of the overrunning coupling 134, the turbine 58 can freewheel independently of the turbine 54. Thus the turbine 54 will become inactive as the hydrokinetic fluid flow vectors change their direction to such an extent that a torque distribution by the turbine 54 no longer is possible. But at that time, torque continues to be applied from the turbine 58 through the coupling 134 to the ring gear 34.

After the speed of rotation of the impeller 52 is reduced substantially, the clutch, as shown in part at 66 and 64, can be applied. This is done by causing the circuit pressure to increase to a value at which the turbine 52 is shifted slightly in a left-hand direction. Thereafter the torque delivery path from the crankshaft to the shaft 144 is entirely mechanical. Prior to this time, however, a portion of the torque is delivered hydrokinetically and the balance of the torque is delivered mechanically. The percentage of the power delivered hydrokinetically progressively decreases as acceleration continues because of the fading characteristics of the converter.

There are not torus circuit losses in the system during mechanical operation since there is no flow in the circuit to establish such losses after the impeller becomes stationary.

To establish reverse drive operation, it merely is necessary to shift the cam ring 106 to a left-hand position, as indicated in FIGURE 2. This locks the turbine 54 so that it will function as a stator, and it releases a stator 56 so that it will operate as a turbine. The impeller is driven by the sun gear 18, and ring gear 34 acts as a reaction member since it is anchored to the housing through the stationary turbine 54 and the overrunning coupling 122. Toroidal fluid circulation then is established as the impeller 52 is driven. The released turbo stator 56 rotates under these conditions in the same direction of rotation as the crankshaft. This motion is imparted to the carrier 46. The sun gear 38, which is connected to the stationary ring gear 34, acts as a reaction member, and the ring gear 43 and the shaft 144 then are driven in a counterclockwise direction which corresponds to reverse drive.

The strategic disposition of the planetary gear elements within the converter reduces the transmission dimensions of the assembly. It is possible to locate the entire engine and transmission assembly on a common axis. It is not necessary to employ chain-type transfer devices or geared connections between a crankshaft situated on one axis and an axle shaft situated on a parallel, spaced axis.

Having thus described a preferred form of my invention, what I claim and desire to secure by U.S. Letters Patent is:

1. In a hydrokinetic power transmission mechanism adapted to deliver driving torque from an engine crankshaft to a driven shaft, a hydrokinetic torque converter having an impeller, a stator and at least one turbine situated in toroidal fluid-flow relationship, a planetary gear system having gear elements located within the bladed members of said converter, said gear system comprising a first simple planetary gear unit and a second compound planetary unit, first simple planetary gear unit comprising a ring gear, a sun gear, a carrier, and planet pinions mounted on said carrier in meshing engagement with said sun and said ring gear, the impeller of said converter being connected to the carrier of said first gear unit, said second gear unit comprising a sun gear, a ring gear, and two sets of planet pinions, the pinions of one set drivably engaging the pinions of the other set, the sun gear of said second planetary gear unit engaging one set of pinions, the ring gear of said second planetary gear unit engaging the other set of pinions, a carrier journalling rotatably each set of pinions, the stator of said converter being connected to the carrier of said second planetary gear unit, the ring gear of said second planetary gear unit being connected drivably to said driven shaft, and an overrunning coupling connected between said turbine and the ring gear of said first gear unit whereby the torque developed hydrokinetically by said converter is transferred through said gear system to said driven shaft to complement the torque delivered mechanically therethrough.

2. The combination as set forth in claim 1 wherein said impeller defines in part a friction brake having a friction surface carried thereon, said friction surface being situated directly adjacent a friction surface carried on the relatively stationary housing portion of said mechanism, said friction surfaces being adapted to engage each other when the speed of rotation of said impeller is reduced following acceleration of said driven shaft.

3. The combination as set forth in claim 1 wherein said converter includes two turbines, one turbine being situated in a radially outward region of said circuit and the other turbine being situated in a radially inward region thereof, a first overrunning coupling connection between said second turbine and the ring gear of said first gear unit for delivering turbine torque to the latter during acceleration and a second overunning coupling connection between said first turbine and the ring gear of said first planetary gear unit which is independent of the overrunning connection for said second turbine.

4. The combination as set forth in claim 3 wherein said turbines include an overrunning coupling connection therebetween whereby relative motion between said turbines in one direction is inhibited although freewheeling motion in the opposite direction is permitted.

5. The combination as set forth in claim 1 including selectively engageable brake means for anchoring said stator to a relatively stationary housing portion of said mechanism and for releasing the same, and a corresponding selectively engageable brake mechanism for anchoring said first turbine to said relatively stationary housing portion and for releasing the same, said first turbine being released and said stator being anchored during forward drive operation and said turbine being anchored and said stator being released during reverse drive operation.

6. The combination as set forth in claim 2 including selectively engageable brake means for anchoring said stator to a relatively stationary housing portion of said mechanism and for releasing the same, and a corresponding selectively engageable brake mechanism for anchoring said first turbine to said relatively stationary housing portion and for releasing the same, said first turbine being released and said stator being anchored during forward drive operation and said turbine being anchored and said stator being released during reverse drive operation.

7. The combination as set forth in claim 3 including selectively engageable brake means for anchoring said stator to a relatively stationary housing portion of said mechanism and for releasing the same, and a corresponding selectively engageable brake mechanism for anchoring said first turbine to said relatively stationary housing portion and for releasing the same, said first turbine being released and said stator being anchored during forward drive operation and said turbine being anchored and said stator being released during reverse drive operation.

8. The combination as set forth in claim 4 including selectively engageable brake means for anchoring said stator to a relatively stationary housing portion of said mechanism and for releasing the same, and a corresponding selectively engageable brake mechanism for anchoring said first turbine to said relatively stationary housing portion and for releasing the same, said first turbine being released and said stator being anchored during forward drive operation and said turbine being anchored and said stator being released during reverse drive operation.

References Cited

UNITED STATES PATENTS

| | | | |
|---|---|---|---|
| 2,551,746 | 5/1951 | Iavelli | 74—688 |
| 2,766,641 | 10/1956 | Kelley | 74—677 |
| 2,861,476 | 11/1958 | Russell | 74—688 |
| 3,025,720 | 3/1962 | Kelley | 74—677 |

ARTHUR T. McKEON, *Primary Examiner.*

U.S. Cl. X.R.

74—688